W. KILMER, Sr.
CHALK LINE REEL.
APPLICATION FILED SEPT. 11, 1916.
1,234,347.
Patented July 24, 1917.
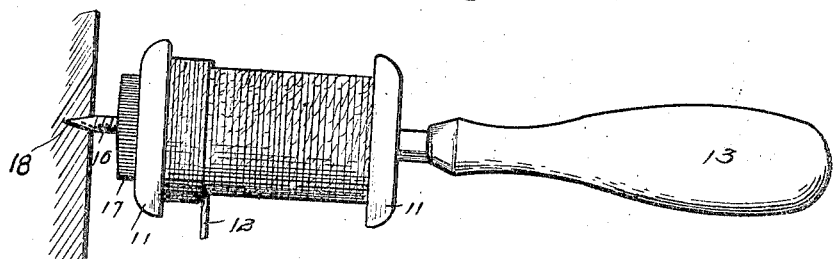
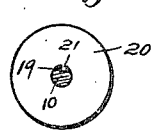
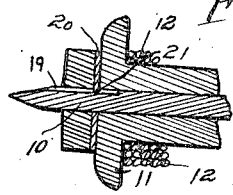
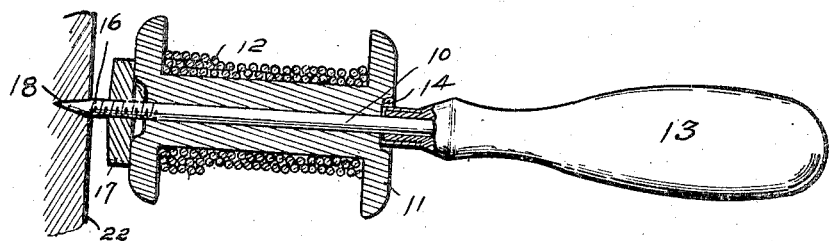

UNITED STATES PATENT OFFICE.

WILLIAM KILMER, SR., OF BROOKLYN, IOWA.

CHALK-LINE REEL.

1,234,347.   Specification of Letters Patent.   Patented July 24, 1917.

Application filed September 11, 1916. Serial No. 119,452.

*To all whom it may concern:*

Be it known that I, WILLIAM KILMER, Sr., a citizen of the United States, and resident of Brooklyn, in the county of Poweshiek and State of Iowa, have invented a certain new and useful Chalk-Line Reel, of which the following is a specification.

The object of my invention is to provide a chalk line reel of simple, durable and inexpensive construction.

A further object is to provide a chalk line reel mounted on a shaft, which shaft is provided with a handle, whereby the reel may be rotated readily, while the handle is held by the user.

A further object is to provide such a shaft with an end adapted to quickly and easily be secured to a part of a building for holding the chalk line reel in place.

A further object is to provide means for locking the reel against rotation on the shaft when desired.

Still a further object is to provide in such a reel, means whereby the reel may be rotated in either direction without affecting the locking device.

My invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of a reel embodying my invention.

Fig. 2 shows a similar view, the reel being shown in vertical section.

Fig. 3 shows a vertical transverse, sectional view of a preferred form of my device, and Fig. 4 shows a vertical, longitudinal sectional view of a preferred form.

In the accompanying drawings, I have used the reference numeral 10 to indicate generally a shaft on which is rotatably mounted a spool 11. On the spool 11 is wound a chalk line 12. Fixed on one end of the shaft 10 is a handle 13 adapted to fit into a recess 14 in one end of the spool. The shaft 10 near the end thereof opposite the handle 13 is provided with screw threads 16 to receive a nut 17. The end of the shaft 10 adjacent to the nut 17 is tapered to a point at 18. It will readily be seen that by screwing the nut 17 tightly against the spool, the handle 13 will be drawn against the spool, and the spool will be locked against rotation on the shaft 10.

In Figs. 3 and 4 I have shown a preferred form of my device, in which the shaft 10 is provided with a slot or key-way 19. On the shaft 10 between the nut 17 and spool 11 is a washer 20 having a lug 21 received in the key-way 19.

My device may be made in either of the forms herein illustrated, but is preferably made in the form shown in Figs. 3 and 4 for the following reasons.

In the use of the chalk line reel when the nut 17 is loosened, the spool may be rotated rapidly on the shaft 10 for unwinding or winging up the chalk line 12. When it is desired to fix the chalk line at the spool end thereof, the nut 17 is screwed on to the shaft 10 until, in the form shown in Figs. 1 and 2, the spool is firmly gripped between the nut and the handle. The point 18 may then be jabbed into the wood 22 for securing one end of the chalk line in position.

It will readily be seen that if the line is wound on the spool in one direction, the strain when the line is strung out, constantly tends to rotate the spool in a direction to unscrew or loosen the nut 17.

To do away with this tendency, I have provided the form of the device shown in Figs. 3 and 4, in which one end of the spool 11 engages the washer 20, which washer 20 is locked against rotation with relation to the shaft, so that any pull on the chalk line will not tend to loosen the nut.

The advantage of the form shown in Figs. 3 and 4 is found in the fact that there is no tendency at any time to loosen the nut and the chalk line may be wound on the reel in any direction.

It will readily be seen that my improved device may be quickly and easily assembled, and adds greatly to the handling of the chalk line.

It will be understood that some changes may be made in the construction and arrangement of the parts of my improved chalk line reel without departing from its essential features and purposes, and it is my intent to cover by this application any such changes which may be included within the scope of my claim.

I claim as my invention:

A chalk line reel, a shaft, a handle on one end thereof, a spool rotatably mounted on said shaft, said shaft being provided at its end opposite the handle with a screw threaded portion, a nut on said screw threaded portion, a washer on said shaft slidably but non-rotatably mounted on said shaft between said nut and said spool, said shaft having a sharp point adjacent to said nut.

Brooklyn, Iowa, September 1st, 1915.

WILLIAM KILMER, Sr.

Witnesses:
W. W. Shannon,
W. D. Carter.